H. B. KRAUT.
COMBINED PUNCHING, SHEARING, SECTION CUTTER, BAR CUTTER, AND COPING AND NOTCHING MACHINE.
APPLICATION FILED MAR. 4, 1919.
1,389,880.
Patented Sept. 6, 1921.
4 SHEETS—SHEET 2.
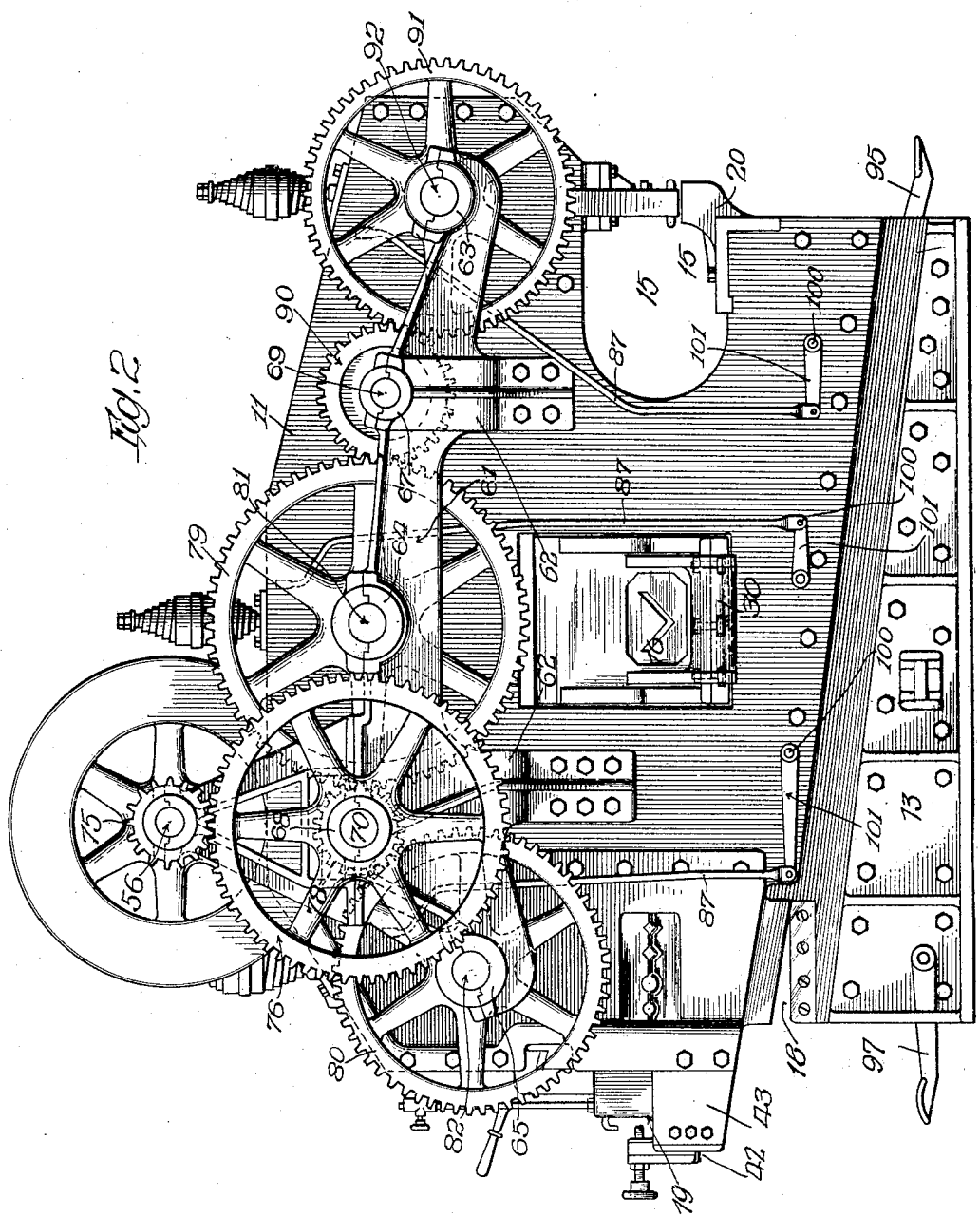
Inventor.
Hans B. Kraut.

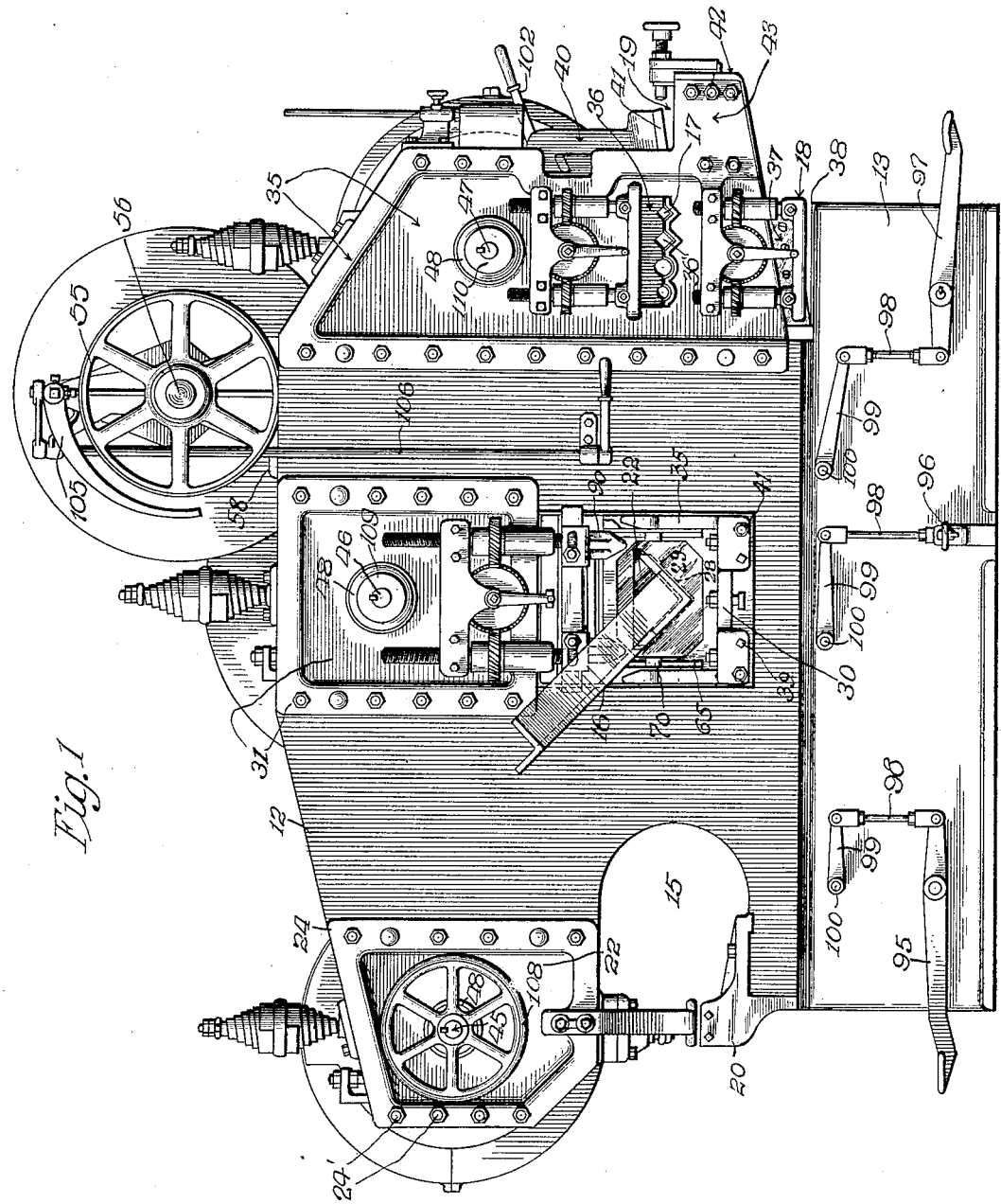

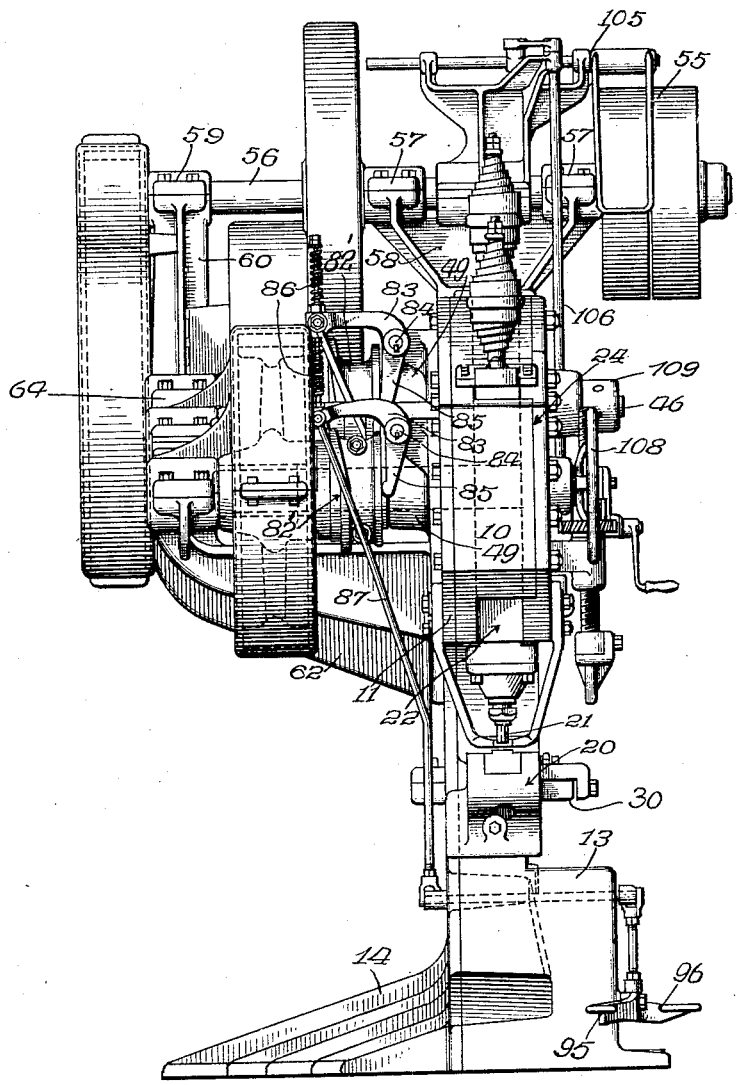

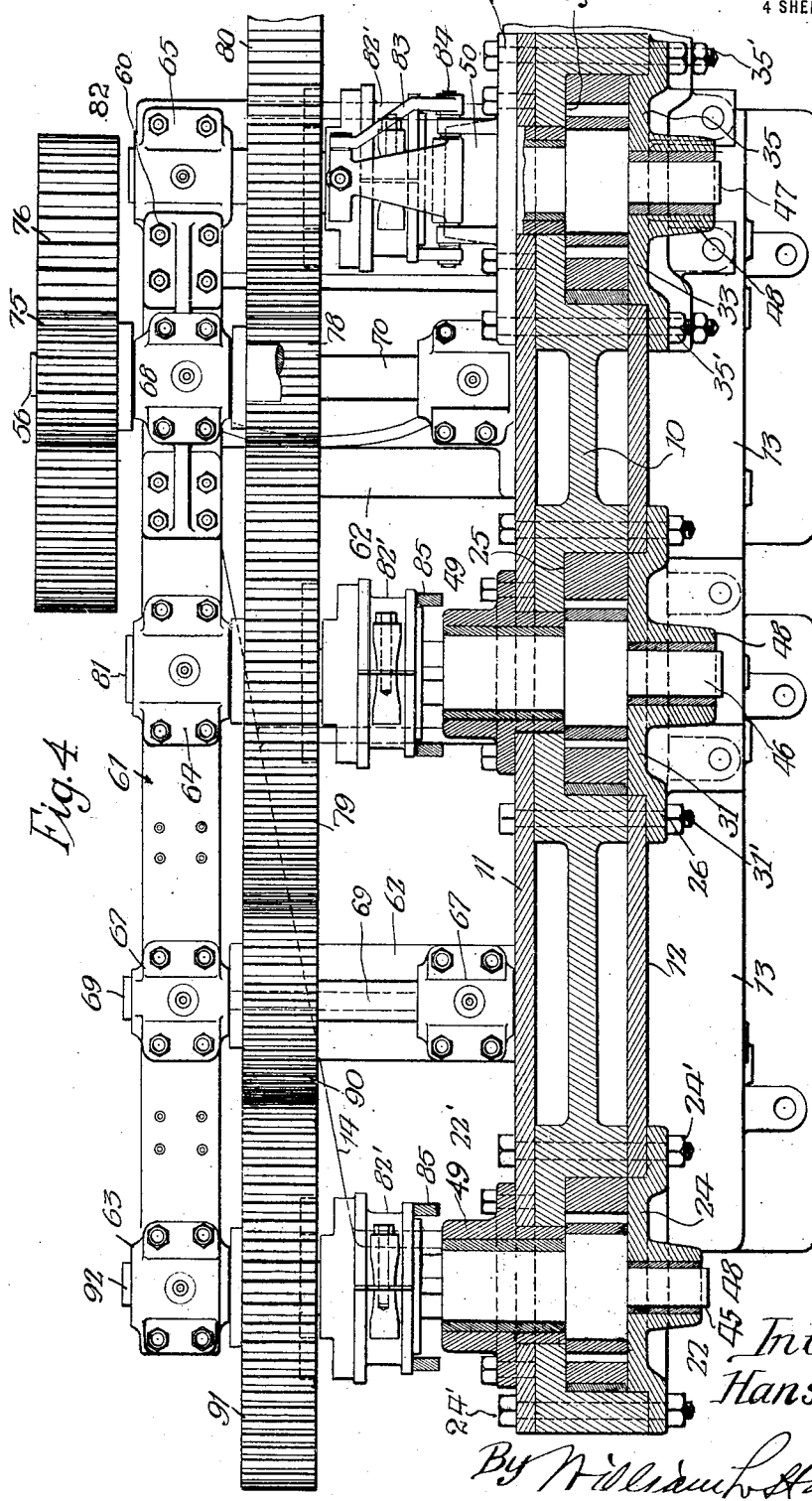

UNITED STATES PATENT OFFICE.

HANS B. KRAUT, OF CHICAGO, ILLINOIS.

COMBINED PUNCHING, SHEARING, SECTION-CUTTER, BAR-CUTTER, AND COPING AND NOTCHING MACHINE.

1,389,880.

Specification of Letters Patent.

Patented Sept. 6, 1921.

Application filed March 4, 1919. Serial No. 280,615.

*To all whom it may concern:*

Be it known that I, HANS B. KRAUT, a citizen of the United States, and a resident of Chicago, in the county of Cook and State of Illinois, have invented certain new and useful Improvements in Combined Punching, Shearing, Section-Cutter, Bar-Cutter, and Coping and Notching Machines; and I do hereby declare that the following is a full, clear, and exact description thereof, reference being had to the accompanying drawings, and to the characters of reference marked thereon, which form a part of this specification.

The invention relates to improvements in metal cutting machines and refers more specifically to a novel combination machine embracing a number of mechanisms for variously cutting or working metal, such as punching, shearing, section cutting, bar cutting, and coping and notching mechanisms. The invention is herein shown as embodying a machine which combines in its structure punching and shearing mechanisms located at opposite ends of the machine frame, section and bar cutter mechanisms located intermediate the ends of the frame, and a coping and notching mechanism located at one end (the shearing end, as herein shown) of the frame. It will be understood, however, that the invention is capable of embodiment in machines embracing a number of metal cutting and working elements less than that herein shown.

Among the principal objects of the invention is to so construct and arrange the various operative elements of the machine, with respect to the gearing for driving the same, that the driving gearing can be so disposed with respect to the various cutting mechanisms and the positions of the operators in presenting the work to the cutting mechanisms that said gearing and the supporting bearings thereof will not interfere or clash with work presented through wide angles to the various cutting mechanisms.

In respect of this feature of the invention, the gearing and the bearings therefor for operating the various slides that carry the cutting tools is disposed on one side of the machine frame so as to leave the other side of the frame free and unhampered for the presentation of work to the various metal working or cutting tools.

Another object of the invention is to provide, in a machine of this character, controlling means, as foot and hand levers for separately controlling the respective operative elements of the machine from positions occupied by the operators when presenting the work to the machine at the operating side thereof.

Another object of the invention is to provide a machine of this character which embraces reciprocating slides that carry the cutting and metal working tools, a frame having guides or ways for said slides, with the frame parts constituting the walls of said guides or ways at the operating side of the machine removable so that said removable frame parts may be removed for the purpose of removing and replacing the slides without interference with driving gearing, and supporting brackets therefor.

Other objects of the invention are to improve and simplify machines of this general character and the invention consists in the combination and arrangement of the parts shown in the drawings and described in the specification, and is pointed out in the appended claims.

In the drawings;

Figure 1 is a side elevation of a machine embodying my invention.

Fig. 2 is an elevation as seen from the opposite side of the machine.

Fig. 3 is an elevation as seen from the punch end thereof.

Fig. 4 is a partial plan and partial horizontal section of the machine.

The frame of the machine embraces as essential elements thereof an intermediate skeleton cast metal member 10, and side plates 11, 12 that are riveted together. The frame comprises also a cast metal supporting base 13 that is provided with a laterally extending stabilizing foot 14, shown as made separate from the base and bolted or otherwise rigidly secured thereto.

The said intermediate frame is formed at its punch end to provide a deep throat 15 and to provide between its ends openings 16, 17 for a section cutter and bar cutter, respectively. The frame is provided at the end of the machine near the bar cutter with a plate cutting and shearing mechanism, designated as a whole by 18 and a coping and notching mechanism designated as a whole by 19. The punching mechanism at the throat 15 embraces a bolster 20 with which coöperates a punch 21 that is carried by a slide 22 which reciprocates vertically in a guide or way 22' formed in the cast metal intermediate frame 10 and therebetween and a cover plate 24 which is applied over an opening in the side plate 12 opposite the recess in said frame and attached to the frame by bolts 24'. Between the ends of the frame at the opening 16, the intermediate skeleton frame member is recessed to provide a guide or way 25 for a vertically reciprocating slide 26 for operating the section cutter mechanism. The slide carries at its lower end the movable blade 28 of the section cutter which coöperates with a fixed blade 29 that is supported on a base flange 30 that is formed integral with the cast metal intermediate frame member 10. The recessed guide or way 25 is closed by a cover plate 31 that is removably fixed, as by means of bolt 31', to one side of the frame.

At the end of the machine remote from the punch, the intermediate frame is formed to provide a guide or way 32 in which vertically reciprocates a slide 33. The recess in which the guide or way 32 is formed is closed by a cover plate 35, which, as shown, extends from top to bottom of the machine frame to constitute one wall of the guide or way, and is removably fixed to the frame, as by means of bolts 35'. The said cover plate 35 and the frame members are cut away between the ends of the cover plate to provide the work clearance 17 for the bar cutter mechanism, the slide 33 carrying the movable blade 36 of said bar cutting mechanism which coöperates with a fixed blade 36' that is carried by the cover plate.

Below said bar cutter mechanism the slide is shaped with an oblique seat to receive, and on which is rigidly fixed, the movable blade 37 of a plate cutting and shearing mechanism that coöperates with the fixed blade 38 which is supported on a seat formed on the base 13 of the machine frame.

The said slide 33 also carries at its rear edge a tool holder 40 on which is mounted the movable blade 41 of a coping and notching mechanism, the movable blade coöperating with a fixed blade that is supported on a bolster 42 that projects forwardly from the machine frame. Said bolster is herein shown as formed by two members 43, 43 that are integral extensions, respectively of the cover plate 35 and a plate 44 which is bolted to the frame on the side thereof opposite to said cover plate.

The various punching, section cutter, bar cutter, and plate cutting and shearing mechanisms are provided with suitable hold down and stripping devices which constitute no part of the present invention and need not be herein specifically described.

The slides 22, 26, and 33 are connected with power and are operated through the medium of shafts 45, 46, 47, which are mounted to rotate in bearings 48, 49, 50. The set of bearings 48 is formed as integral tubular parts of the cover plates 24, 31, 35. The bearings 49 for the shafts 45, 46 are flanged bearings and are bolted to the machine frame, and the bearing 50 for the shaft 47 is formed integral with the plate 44, which carries one member of the bolster support 42.

The various operating shafts are herein shown as driven by power applied through a fast and loose pulley, designated as a whole by 55, that are mounted on a shaft 56 which extends transversely across the frame. Said shaft rotates in bearings 57 that are formed on an upstanding bracket 58 that is supported on the machine frame and in an extension bearing 59 that is formed on a bracket 60 which rises from and is attached to an elongated bracket 61 which is located on the side of the frame opposite to the removable cover plates 24, 31, and 35. Said bracket 61 carries bearings for the various shafts of the operating gearing, as will hereinafter appear. Said bracket 61 is fixed to the machine frame by means of arms 62 bolted to and extending laterally from the adjacent side of the frame. It carries bearings 63, 64, 65 for the respective shafts 92, 81, and 82 that are disposed in respective alinement with the operating shafts 45, 46, 47. The bracket 61 also carries intermediate bearings 67, 68 for intermediate shafts 69, 70.

The shafts 46, 47 for the section cutter and shearing slides are driven from the power shaft 56 through the medium of a pinion 75 that is fixed to the power shaft, a gear 76 that is fixed to the shaft 70 and a pinion 78 fixed also to said shaft 70 and meshing with gear wheels 79, 80 that are rotatively mounted on the shafts 81, 82, respectively, in line with the respective shafts 46, 47. Said gear wheels 79, 80 are adapted to be connected to the shafts 46, 47 through the medium of clutches, designated as a whole by 82'. The clutches shown are of the same construction as that illustrated in my companion application for United States Letters Patent Serial Number 280,614 filed on the 4th day of March, 1919. It embraces in its structure a collar slidable on the operating shaft toward and away from a mating clutch face on the associated gear wheels 79, 80. The clutch collar is slidable on its shafts through the medium of an actuating device in the nature of a yielding bell crank lever designated as a whole by 83 (Fig. 3) fixed to a rock shaft 84 and embracing bearer fingers 85 that bear against the rear face of the clutch collar. Said fingers are normally moved or spaced away from the clutch collar by a spring 86 acting on the outer end of the lever 83 and the clutch elements are forced and held together by power applied through a link 87, as set forth in my aforesaid companion application Serial Number 280,614.

The punch operating shaft 45 is driven from the gearing described through the medium of an idler gear 90 mounted on the shaft 69 and meshing with the gear wheel 79 and a second gear wheel 91 which is rotatively mounted on the shaft 92 that lies in axial extension of the punch operating shaft 45 and is adapted to be connected thereto by a clutch mechanism 82' of the character hereinabove referred to.

The links 87 of the various clutches are extended downwardly toward the base 13 of the machine frame and are severally connected to foot levers or treadles 95, 96, 97 (Fig. 1), located, respectively at the punch end, center, and shear end of the machine. The said foot levers are connected by links 98, and arms 99 with rock shafts 100 that extend transversely through and are mounted in bearings in the lower part of the machine frame, and are connected on the gear side of the machine through levers 101 to the lower ends of the links 87. Hand levers may also be connected to certain of the rock shafts on the gear side of the machine for the purpose of actuating said clutches. When the loose and tight pulley drive is employed, the belt shifter 105 may be operated by a rocking operating shaft 106 that extends downwardly alongside the operating side of the machine.

Fixed to the punch operating shaft 45 is a hand wheel 108 (Figs. 1 and 3) by which said shaft may be turned to adjust the punch toward and from the work when the clutch 82 of said shaft is disconnected from the driving gear mechanism. Similarly, the operating shafts 46, 47 of the slides 26, 33 are provided with fixed collars 109, 110 that are provided with sockets to receive levers by which said shafts may be turned and the tools carried by the slides 26, 33 adjusted toward and from the work.

It will be thus seen that all of the gearing for driving the several operating shafts is located wholly at one side of the machine frame so that the other or operating side of the frame is free from driving gearing and bearings therefor, which, if present, would interfere with the free presentation of the work to said various cutting tools. This latter side of the machine, therefore, may be aptly termed the operating side of the machine, as distinguished from the gearing side thereof.

It will, furthermore, be seen that the controls of the various mechanisms, embracing the foot levers for the clutches, are also brought out on the operating side of the machine so that each foot lever is in position for convenient access to an operative who is presenting the work to the associated mechanism, whether it be the punch, section cutter, or the shearing, bar cutter, or notching mechanisms. The use of the laterally extended foot 14 gives proper balance to the frame to carry the weight of the gearing on one side of the frame. The arrangement shown permits access to the machine, unhampered by any projecting parts on the operating side thereof, such as to limit the work being done. For instance, in the miter cutting bars and sections it is essential that the work be presented to the cutting and shearing mechanisms through widely varying angles, both vertically and horizontally, and the presence of projecting bearings or gearing on the operating side of the machine is objectionable, as it would limit the range of angular presentation desired and necessary. While the driving mechanism, embracing the tight and loose pulleys 55, somewhat overhang the operating side of the machine, it will be understood that said pulleys are so vertically spaced from the several mechanisms at the operating side of the machine as to not interfere with the presentation of the work to the machine and that, in this respect, the arrangement shown has all the advantages of the alternative power arrangement where the gearing is driven by a motor supported at the top of the machine, such as is shown in my companion application, Serial Number 280,614 filed on the 4th day of March, 1919.

I claim as my invention:

1. A combined punching, section cutting and shearing machine embracing a frame having transverse clearance openings opening at one side of and extending through the frame of the machine, coöperating tools at said openings and tool operating gear mechanism and supporting brackets therefor located wholly at and supported on the other side of the machine frame above said clearance openings.

2. A combined punching, section cutting, and shearing machine embracing a frame, slides reciprocable therein, tools carried by said slides to coöperate with fixed tools on the frame, said frame being designed to provide at said coöperating tools clearance openings which extend transversely through the frame and being free at its operating side from driving gears and bearings, and a gear train on the opposite side of the frame above said clearance openings and having means to connect it to power and operatively connected to said slides.

3. A combined punching, section cutting, and shearing machine embracing a frame designed to provide transverse through work clearance openings, coöperating tools at said openings, said frame being free at one side from driving gears and bearings, tool operating shafts extending transversely through and rotatably mounted in bearings in said frame, and a train of gears to connect said operating shafts to power located wholly on the opposite side of said frame above said clearance openings.

4. A combined punching, section cutting, and shearing machine embracing a frame designed to provide transverse through work clearance openings, coöperating tools at said openings, said frame being free at one side from driving gears and bearings, tool operating shafts extending transversely through and rotatably mounted in bearings in said frame, and a train of gears to connect said operating shafts to power and located wholly on the opposite side of said frame, embracing extension shafts, with clutches separately to connect them to the operating shafts and a bracket on the latter side of the machine carrying bearings to support said extension shafts.

5. A combined punching, section cutting, and shearing machine embracing a frame designed to provide transverse work clearance openings, coöperating tools at said openings, said frame being free at one side from driving gears and bearings, tool operating shafts extending transversely through and rotatably mounted in bearings in said frame, a train of gears to connect said operating shafts to power and located wholly on the opposite side of said frame, embracing extension shafts, a bracket on the latter side of the machine carrying bearings to support said extension shafts, and clutch mechanisms in said gear train to separately control the operations of the several tools and clutch actuating means brought out on the operating side of said frame.

6. A combined punching, section cutting, and shearing machine embracing a frame, slides reciprocable therein, tools carried by said slides to coöperate with tools fixed on the frame, said frame being designed to provide at said coöperating tools through clearance openings and being free at its operating side from driving gears and bearings, a gear train having means to connect it to power and operatively connected to said slides and supported on the side of the frame opposite from and above the clearance openings at the operating side, and gear controlling devices extending from the gear side of the frame and brought out on the operating side of the frame.

7. A combined punching, section cutting, and shearing machine embracing a frame, pairs of coöperating metal working tools and their slides, with operating shafts therefor, said frame being designed to provide at said coöperating tools transverse clearance openings, and a gear train wholly on one side of the frame, and having means to connect it to power and operatively connected to said shafts, said gear train embracing a plurality of independently operable clutches, and clutch operating devices comprising links and levers extending from said clutches, and brought out on the operating side of the machine where they are provided with actuating devices.

8. A combined punching, section cutting, and shearing machine embracing a frame, pairs of coöperating metal working tools at transverse clearance openings in the frame and to which work is presented from the operating side of the frame, slides and shafts for said tools, a gear train on the other side of the frame to connect said shafts to power, said gear train embracing controlling clutches, links connected to said clutches and extending toward the base of the frame, rock shafts mounted in the frame base and connected to said links, and actuating devices on the operating side of the frame connected to said rock shafts.

9. A multiple metal working machine embracing a frame having an operating side and a gear side, transverse tool clearance openings in the frame which open at the operating side of the frame for presentation of different kinds of work thereto, coöperating tools at said openings, and operating means separately to actuate said tools at said openings, embracing a gear train and supporting bracket therefor supported wholly on the gear side of the machine away from interference with presentation of work to any of said coöperating tools, said gear train embracing controlling means to separately control power transmitted to any of said coöperating tools.

In testimony that I claim the foregoing as my invention, I hereunto append my signature at Chicago, Illinois, this 17th day of February, 1919.

HANS B. KRAUT.